United States Patent [19]
Endoh

[11] Patent Number: 5,242,517
[45] Date of Patent: Sep. 7, 1993

[54] PIPE LINER AND A METHOD FOR MANUFACTURING SAME

[75] Inventor: Shigeru Endoh, Kasukabe, Japan

[73] Assignee: Get Inc., Ibaraki, Japan

[21] Appl. No.: 720,065

[22] Filed: Jun. 24, 1991

[30] Foreign Application Priority Data

Jun. 29, 1990 [JP] Japan .................................. 2-169741

[51] Int. Cl.$^5$ ...................... B29C 63/16; B29C 63/18; B29C 63/28
[52] U.S. Cl. .......................... 156/92; 156/93; 156/156; 156/286; 156/294; 264/314; 264/571
[58] Field of Search ............... 156/92, 93, 87, 156, 156/286, 287, 294, 289; 428/36.1, 36.2; 427/238; 264/571, 573, 314

[56] References Cited

U.S. PATENT DOCUMENTS

| | | | |
|---|---|---|---|
| 3,463,059 | 8/1969 | Vonk | 156/287 |
| 3,928,101 | 12/1975 | Tucker | 156/156 |
| 4,009,063 | 2/1977 | Wood | 156/294 |
| 4,282,905 | 8/1981 | Dopkin et al. | 156/156 |
| 4,366,012 | 12/1982 | Wood | 156/287 |
| 4,446,181 | 5/1984 | Wood | 156/294 |
| 4,891,179 | 1/1990 | Peacock et al. | 264/314 |
| 5,098,498 | 3/1992 | Hale et al. | 156/286 |

FOREIGN PATENT DOCUMENTS

| | | | |
|---|---|---|---|
| 221222 | 9/1989 | Japan | 156/294 |
| 2113608 | 8/1983 | United Kingdom | 156/294 |

Primary Examiner—Michael W. Ball
Assistant Examiner—Steven D. Maki
Attorney, Agent, or Firm—Lowe, Price, LeBlanc & Becker

[57] ABSTRACT

A method of manufacturing a pipe liner with which a pipe is internally lined,
forming a tubular body from a lengthy rectangular belt of a resin-absorbable flexible material by sewing the longer sides of the rectangle together; and
coating either the inner or outer surface of the tubular body with an airtight plastic film, for example, by:
(a) inserting the tubular resin-absorbable flexible material into the airtight plastic film tube;
(b) wrapping the two-layer tube with a tubular film of release means;
(c) inserting an inflatable bag into the multi-layer tube;
(d) pneumatically inflating the inflatable bag to thereby radially press the multi-layer tube from inside to thereby cause the multi-layer tube to become cylindrical;
(e) causing the airtight plastic film to adhere closely to the resin-absorbable flexible material by removing the air trapped between the resin-absorbable flexible material and the airtight plastic film tube by drawing the air from the resin-absorbable flexible material by means of a suction means; and
(f) heating and fusing the airtight plastic film by means of a shiftable electric heater to thereby coat the resin-absorbable flexible material with the airtight plastic film.

10 Claims, 3 Drawing Sheets

PIPE LINER AND A METHOD FOR MANUFACTURING SAME

1. FIELD OF THE INVENTION

The present invention relates to a pipe liner mainly to repair a defective pipe by internally lining it, and a manufacturing method for the same pipe liner.

2. DESCRIPTION OF THE PRIOR ART

When an underground utility pipe or an underground industrial pipe, such as sewer pipe, gas pipe, and electric conduit pipe, is defective, the pipe is repaired and refreshed without digging and disassembling the sections of the pipe. This method of repairing a pipe is known and practiced in the field of civil engineering (ref. U.S. patent application Ser. No. 07/665,125).

This method of pipe repair comprises inserting a sufficiently long tubular airtight flexible liner into the defective pipe by fluid pressure. The tubular liner is made of a flexible resin-absorbable material, and has the outer surface coated with a hermetic film. More particularly, the tubular flexible liner is closed at one end and open at the other. The tubular flexible liner is first flattened. The closed end of the tubular liner is tied to a control rope. The open end of the tubular liner is made to gape wide and hooked at the end of the defective pipe in a manner such that the wide-opened end of the liner completely and fixedly covers and closes the pipe end. Then, a fluid with pressure is applied to the tubular liner such that the fluid urges the tubular liner to enter the defective pipe. Since one end of the tubular liner is hooked at the end of the pipe, it remains there while the rest of the flexible liner is turned inside out as it proceeds in the pipe. (This manner of insertion is vonventionally called "reversing".) When the entire length of the tubular liner is reversed (or turned inside out) in the pipe, the control rope holds the closed end of the tubular liner to thereby control the length of the tubular liner in the pipe. Then the reversed tubular liner is pressed against the inner surface of the defective pipe, and the tubular flexible liner is hardened by heating, or by some other procedure depending on the hardening property of the material of the liner. In this manner it is possible to line the inside wall of the defective pipe with a rigid liner without digging the ground and disassembling the pipe sections.

According to the conventional method of manufacturing such tubular liner used for repairing pipes, one face of a long flexible resin-absorbable mat impregnated with a hardenable resin is coated with a hermetic film such as a plastic film and is cut into belts having a predetermined width; then the belt is warped round in a manner such that the end faces along the longer sides of the belt meet with each other; finally the two longer sides are sewed together with zigzag stitches (ref. Japanese Patent Kokoku No. 58-33098). In practice, after this sewing, the stitched area is sealed by means of a sealing tape or by applying a sealing resin; otherwise the reversing operation would be less smooth and effective.

3. PROBLEMS THE INVENTION SEEKS TO SOLVE

However, in this conventional manufacturing method, when the flexibility of the resin-absorbable mat is too high or too low, or when the thickness of the mat is too small, or when the diameter of the cylindrical liner to be eventually formed will be less than about 100 mm, it has been very difficult to seal the area of stitching (seam line) after the longer sides (edges) of the belt slitted from the mat were sewed together; this is because the stitched area of the surface of the tubular liner thus formed would not be smooth. Thus, to seal the sewed area of the tubular liner required a complicated and skilled work.

The present invention was made in view of solving this problem and others, and it is therefore an object of the invention to provide a method of manufacturing a tubular pipe liner which is improved in that it is possible to form easily a tubular liner of which the inner or outer surface is completely sealed, from a resin-absorbable flexible material regardless of the material or the dimension of the resin-adsorbable flexible material.

4. SUMMARY OF THE INVENTION

In order to attain the above-described object and others, the inventor contrived a method of manufacturing a pipe liner with which a pipe is internally lined, comprising the steps of:

forming a tubular body from a lengthy rectangular belt of a resin-absorbable flexible material by connecting the longer sides of the rectangle together; and coating either the inner or outer surface of the tubular body with an airtight plastic film.

In a preferred embodiment of the invention, the method comprises the steps of:

(a) forming a tubular body from a lengthy rectangular belt of a resin-absorbable flexible material by sewing the longer sides of the rectangle together;

(b) inserting the tubular resin-absorbable flexible material into an airtight plastic film tube;

(c) wrapping the two-layer tube with a tubular film of release means;

(d) inserting an inflatable bag into the multi-layer tube;

(e) pneumatically inflating the inflatable bag to thereby radially press the multi-layer tube from inside to thus cause the multi-layer tube to become cylindrical;

(f) causing the airtight plastic film to adhere closely to the resin-absorbable flexible material by removing the air trapped between the resin-absorbable flexible material and the airtight plastic film tube by drawing the air from the resin-absorbable flexible material by means of a suction means; and (g) heating the airtight plastic film to fuse to thereby coat the resin-absorbable flexible material with the airtight plastic film by means of a shiftable electric heater.

In an alternative embodiment, the method of the invention comprises the steps of:

(a) forming a tubular body from a lengthy rectangular belt of a resin-absorbable flexible material by sewing the longer sides of the rectangle together;

(b) inserting an airtight plastic film tube into the tubular resin-absorbable flexible material;

(c) wrapping the two-layer tube with a tubular filmy airtight means;

(d) wrapping the three-layer tube with a tubular film of release means;

(e) inserting an inflatable bag into the multi-layer tube;

(f) pneumatically inflating the inflatable bag to thereby radially press the multi-layer tube from inside to thus cause the multi-layer tube to become cylindrical;

(g) causing the airtight plastic film to adhere closely to the resin-absorbable flexible material by removing the air trapped between the resin-absorbable flexible material and the airtight plastic film tube by drawing the air from the resin-absorbable flexible material by means of a suction means; and (h) heating the airtight plastic film to fuse to thereby coat the resin-absorbable flexible material with the airtight plastic film by means of a shiftable electric heater.

6. EFFECTS OF THE INVENTION

As is clear from the above description, according to the invention, a highly airtight plastic tubular film is placed immediately inside or outside of the tubularly formed resin-absorbable flexible material, and an airtight inflatable flexible bag is used to press radially the plastic film and the resin-absorbable flexible material so that the latter two bodies become cylindrical, and after this, the air between the plastic film and the resin-absorbable flexible material is sucked out so that the two bodies are closely in contact with each other, and only after this the plastic film is fused by the heating means so that either one of the surfaces of the resin-absorbable flexible material is coated hermetically with the plastic film. In this manner, it is possible to obtain an excellently airtight pipe liner irrespective of the desired size of the liner or the desired material of the resin-absorbable flexible material. Since the resin-absorbable flexible material is coated with the airtight plastic film after it is tubularly sewn there is no need of specially sealing the seam area of the resin-absorbable flexible material, and thus the labor cost and operation time are significantly saved.

The above and other objects and features of the invention will appear more fully hereinafter in the following description given in connection with the accompanying drawings and the novelty thereof pointed out in the appended claims.

DETAILED DESCRIPTION OF THE INVENTION

Now, an embodiment of the invention shall be explained with reference to the attached drawings.

Figure 1:
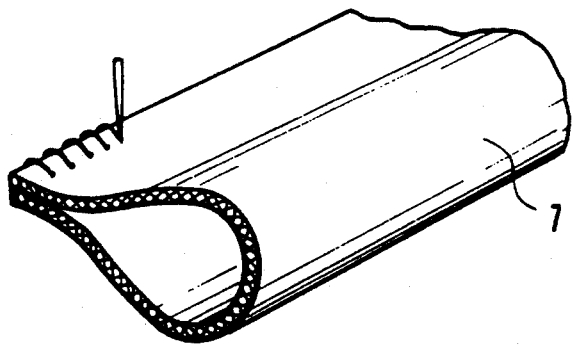
FIG. 1 is a perspective view of a resin-absorbable flexible belt which is curled round and being sewed together along the longer sides to form a tube.
Figure 2:
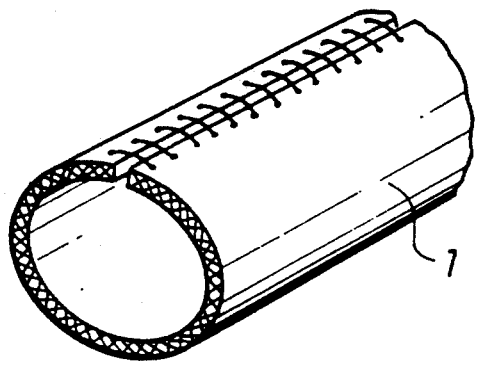
FIG. 2 is a perspective view of the same tube of FIG. 1 after the tubular body was forced to shape such that the end faces along the longer sides are opposed to each other.

FIGS. 1 through 5 illustrate the steps of the method of the present invention. Firstly, referring to FIG. 1, a lengthy rectangular resin-absorbable flexible material 1 is curled round in a manner such that the longer sides of the rectangle get together and the end faces along the longer sides of the rectangle become flush with each other. Then, the longer sides of the material 1 thus brought together are sewed together by means of a sewing machine. After the sewing, the tubular body of the resin-absorbable flexible material 1 is pulled at the stitching and forced to shape such that the end faces along the longer sides are opposed to each other, as shown in FIG. 2. Incidentally, the mode of the sewing of the material 1 can be rock sewing or straight sewing, or it is also possible to bind the longer sides of the material 1 together by needle punching such as stapling, by fusing and welding the sides together, or even by using an adhesive. The material for the resin-absorbable flexible material 1 can be a woven or nonwoven fabric made from polyester fiber, nylon fiber, acrylic fiber, polypropylene fiber, etc.

Figure 3:
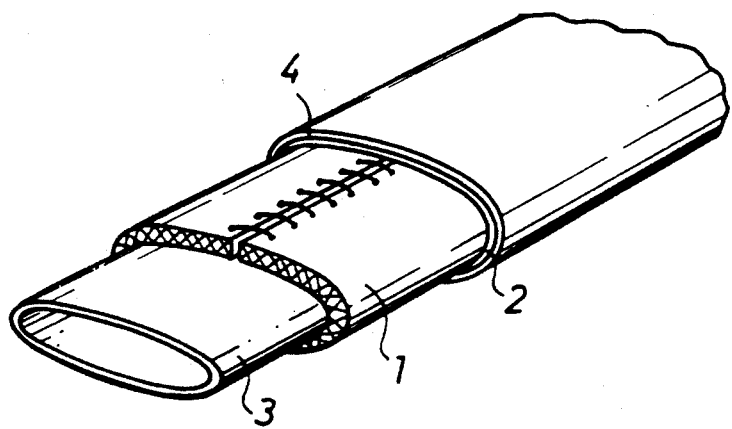
FIG. 3 is a perspective view of showing a four-layer tubular body consisting, from inward to outward, of an airtight inflatable flexible bag, the resin-absorbable flexible material, an airtight plastic film, and a filmy release means.

Next, the tubular resin-absorbable flexible material 1 is passed into a plastic film tube 2. Then, a highly airtight inflatable flexible bag 3 is inserted into the tubular resin-absorbable flexible material 1 so that a multi-layer tubular body as shown in FIG. 3 is obtained. The outermost of the multi-layer tubular body is covered with a release film 4. Incidentally, the plastic film tube 2 as well as the release film 4 is manufactured by the known tubular film process wherein a molten resin is inflated and molded into a tube in a manner such that the thickness of the film is controlled to be thin and uniform; or it is possible to manufacture the plastic film tube 2 by patching together numerous patches of plastic film. The material for the plastic film tube 2 can be selected from polyurethane, polyvinyl chloride (PVC), ethylene vinyl acetate (EVA), polyethylene, polypropylene, nylon, and a copolymer made from any of these.

Figure 4:
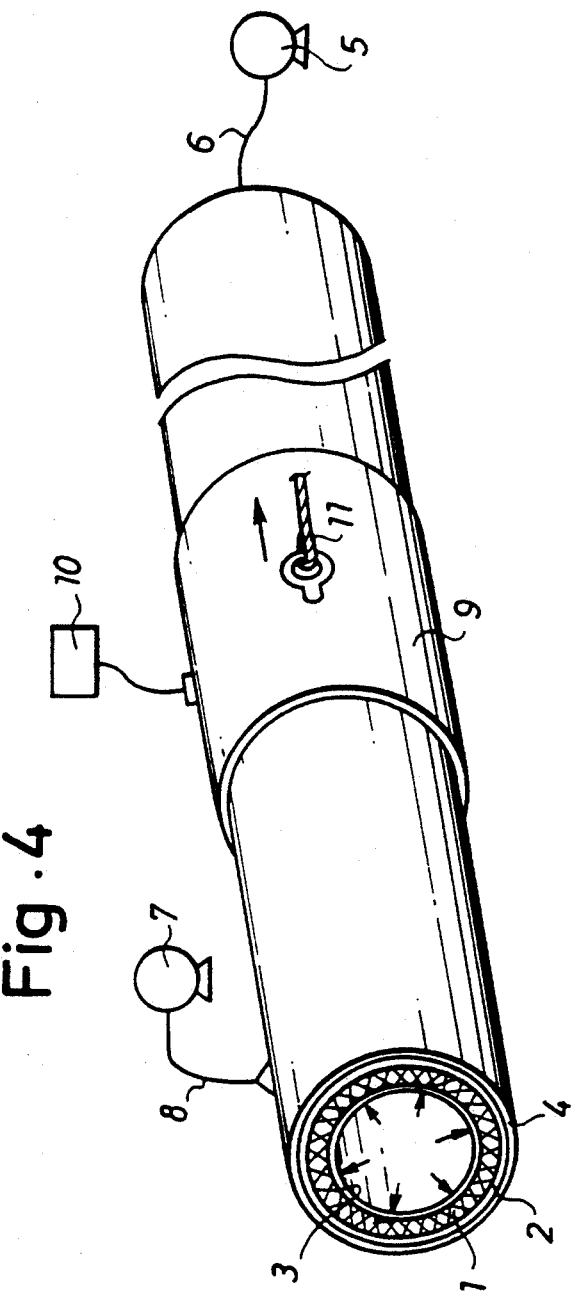
FIG. 4 is a perspective and cross-sectional view of the four-layer tubular body being inflated into a cylindrical shape and heated with a heating means.
Figure 5:
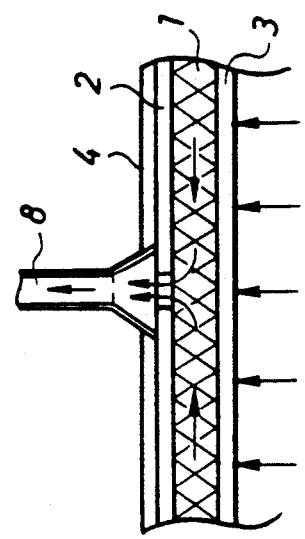
FIG. 5 is a cross-sectional view of a portion of the four-layer tubular body showing how a pressure reducing hose is attached to a portion of the four-layer tubular body.

Next, the both ends of the inflatable flexible bag 3 are closed and thus the inflatable flexible bag 3 becomes hermetically sealed. Then, the multi-layer tubular body is passed in a shiftable cylindrical heater 9. After this, as shown in FIG. 4, an air hose 6 is connected between a compressor 5 and an end portion of the sealed inflatable flexible bag 3. Also, a pressure reducing hose 8 connected to a vacuum pump 7 is attached to an end portion of the multi-layer tubular body, as shown in FIG. 4 and FIG. 5.

Then, the compressor 5 is operated so that the compressed air is supplied into the inflatable flexible bag 3 via the air hose 6. Thus, the inflatable flexible bag 3 is inflated by the compressed air and presses the tubular resin-absorbable flexible material 1 against the plastic tube 2 covered with the release film 4. As a result, the multi-layer tubular body consisting of the flexible bag 3, the resin-absorbable flexible material 1, the plastic tube 2 and the release film 4 becomes cylindrical, as shown in FIG. 4.

Next, the vacuum pump 7 is operated so that the air trapped between the plastic tube 2 and the resin-absorbable flexible material 1 as well as the air existing in the resin-absorbable flexible material 1 itself is sucked and drawn out through the pressure reducing hose 8, whereby the plastic tube 2 with the release film 4 is adsorbed closely onto the outer surface of the resin-absorbable flexible material 1.

While thus keeping the plastic film tube 2 pressed tightly on the resin-absorbable flexible material 1, the shiftable cylindrical heater 9 is electrically energized by an electric power supply 10, and pulled in the direction indicated by the arrow by means of a rope 11 to shift along the length of the multi-layer tubular body, as shown in FIG. 4. Thus, the plastic tube 2 is heated and fused to thereby stick to the entire outer surface of the resin-absorbable flexible material 1. As the result, the outer surface of the resin-absorbable flexible material 1 including the seam portion is coated and thereby sealed with the plastic film 2. Incidentally, since the plastic film tube 2 is covered with the release film 4, even if the fused plastic tube 2 touches the heater 9, it does not stick thereto.

When the coating of the resin-absorbable flexible material 1 with the plastic tube 2 is completed, the operations of the compressor 5 and the vacuum pump 7 are stopped, and the compressed air in the inflatable flexible bag 3 is vented into the atmosphere. Then, the inflatable flexible bag 3 is pulled out from the resin-absorbable flexible material 1, and you are left with a desired airtight pipe liner ready to be used in repairing a defective pipe.

As described above, according to the present embodiment of the invention, the resin-absorbable flexible material 1 is first formed into a tubular body by sewing, and only after this the resin-absorbable flexible material 1 is externally coated with the plastic film 2, so that the seam portion of the tubular body of the resin-absorbable flexible material 1 is easily and completely sealed. This sealing can be attained without difficulty irrespective of the material or the size of the resin-absorbable flexible material 1.

Figure 6:
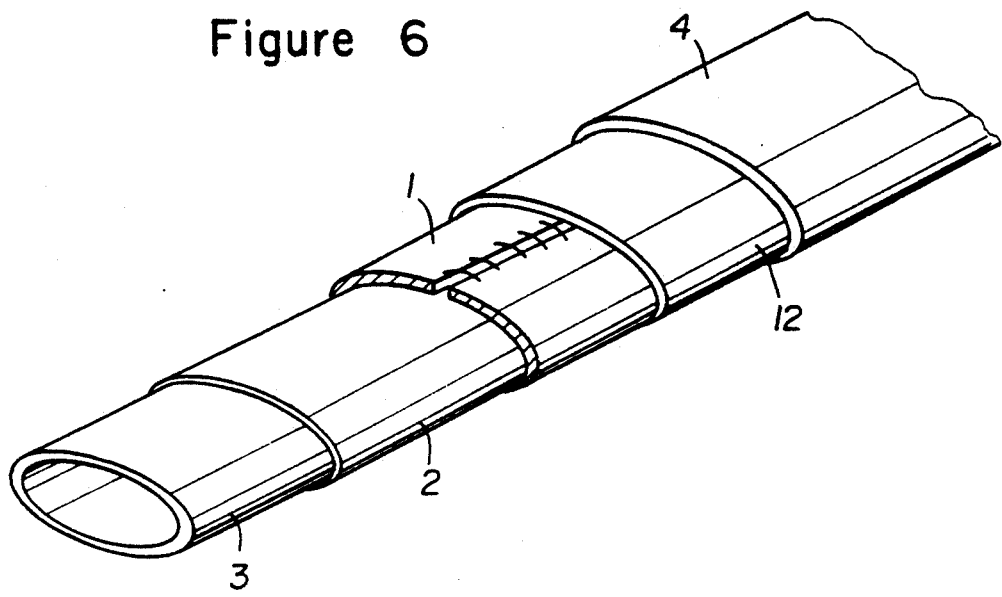
FIG. 6 is a perspective view of another embodiment of the present invention.

Incidentally, in the above embodiment, the tubular resin-absorbable flexible material 1 is passed inside the plastic film 2, but alternatively it is possible to insert the plastic film 2 inside the resin-absorbable flexible material 1 as shown in FIG. 6. In the latter case, however, it is necessary to provide a highly airtight filmy tube 12 outside the resin-absorbable flexible material 1 so that the air trapped between the resin-absorbable flexible material 1 and the plastic film 2 can be effectively removed by the suction operation of the vacuum pump 7.

Although the thus prepared pipe liner is used as a highly effective lining material for a defective pipe, the liner can also be used, as it is, as a fluid transportation hose.

As is clear from the above description, according to the invention, a highly airtight plastic tubular film 2 is placed immediately inside or outside of the tubularly formed resin-absorbable flexible material 1, and an airtight inflatable flexible bag 3 is used to press radially the plastic film 2 and the resin-absorbable flexible material 1 so that the latter two bodies become cylindrical, and after this, the air between the plastic film 2 and the resin-absorbable flexible material 1 is sucked out so that the two bodies are closely in contact with each other, and only after this the plastic film 2 is fused by the heater 9 so that the resin-absorbable flexible material 1 is coated hermetically with the plastic film 2. In this manner, it is possible to obtain an excellently airtight pipe liner irrespective of the desired size of the liner or the desired material of the resin-absorbable flexible material. Since the resin-absorbable flexible material 1 is coated with the airtight plastic film 2 after it is tubularly sewn there is no need of specially sealing the seam area of the resin-absorbable flexible material 1, and thus the labor cost and operation time are significantly saved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a pipe liner that is used to internally line a pipe comprising the steps of:
    (a) forming a tubular body from a lengthy rectangular belt of a resin-absorbent flexible material by connecting the longer sides of the rectangle together;
    (b) forming a two-layer tube by inserting the tubular body into an airtight plastic film tube;
    (c) forming a multi-layer tube by wrapping the two-layer tube with a tubular film of release means;
    (d) inserting an inflatable bag into the multi-layer tube;
    (e) pneumatically inflating the inflatable bag to thereby radially press the multi-layer tube from inside to thus cause the multi-layer tube to become cylindrical;
    (f) causing the airtight plastic film tube to adhere closely to the tubular body of resin-absorbent flexible material by removing the air trapped between the tubular body of resin-absorbent flexible material and the airtight plastic film tube by drawing the air from the tubular body of resin absorbent flexible material by means of a suction means; and
    (g) heating the multi-layer tube to fuse the airtight plastic film tube to the tubular body of resin-absorbent flexible material by means of a shiftable electric heater, thereby coating an outer surface of the tubular body of resin-absorbent flexible material with the airtight plastic film tube.

2. A method as claimed in claim 1 wherein at said step (a) the longer sides of the lengthy rectangular belt is connected together by sewing.

3. A method as claimed in claim 1 wherein at said step (a) the longer sides of the lengthy rectangular belt are connected together by stapling.

4. A method as claimed in claim 1 wherein at said step (a) the longer sides of the lengthy rectangular belt are connected together by fusing the sides together.

5. A method as claimed in claim 1 wherein at said step (a) the longer sides of the lengthy rectangular belt are connected together by means of an adhesive.

6. A method of manufacturing a pipe liner that is used to internally line a pipe comprising the steps of:
    (a) forming a tubular body from a lengthy rectangular belt of a resin-absorbent flexible material by connecting the longer sides of the rectangle together;
    (b) forming a two-layer tube by inserting an airtight plastic film tube into the tubular body;
    (c) forming a three-layer tube by wrapping the two-layer tube with a tubular airtight filmy means;
    (d) forming a multi-layer tube by wrapping the three-layer tube with a tubular film of release means;
    (e) inserting an inflatable bag into the multi-layer tube;
    (f) pneumatically inflating the inflatable bag to thereby radially press the multi-layer tube from inside to thus cause the multi-layer tube to become cylindrical;
    (g) causing the airtight plastic film tube to adhere closely to the tubular body of resin-absorbent flexible material by removing the air trapped between the tubular body of resin-absorbent flexible material and the airtight plastic film tube by drawing the air from the tubular body of resin-absorbent flexible material by means of a suction means; and (h) heating the multi-layer tube to fuse the airtight plastic film tube to the tubular body of resin-absorbent flexible material by means of a shiftable electric heater, thereby coating an inner surface of the tubular body of resin-absorbent flexible material with the airtight plastic film tube.

7. A method as claimed in claim 6 wherein at said step (a) the longer sides of the lengthy rectangular belt are connected together by sewing.

8. A method as claimed in claim 6 wherein at said step (a) the longer sides of the lengthy rectangular belt are connected together by stapling.

9. A method as claimed in claim 3 wherein at said step (a) the longer sides of the lengthy rectangular belt are connected together by fusing the sides together.

10. A method as claimed in claim 6 wherein at said step (a) the longer sides of the lengthy rectangular belt are connected together by means of an adhesive.

* * * * *